United States Patent Office 2,846,393
Patented Aug. 5, 1958

2,846,393

HEAVY DUTY SOLUBLE OIL COMPOSITION

George R. Cook, Des Plaines, Warren W. Cortiss, Cary, and Allan A. Manteuffel, Crystal Lake, Ill., assignors to The Pure Oil Company, Chicago, Ill., a corporation of Ohio No Drawing. Application November 17, 1955
Serial No. 547,546

7 Claims. (Cl. 252—33.3)

This invention relates broadly to heavy duty soluble oil compositions, and the art of formulating same, which exhibit high load-carrying capacity and form stable emulsions with both hard and soft waters. More particularly, the invention relates to heavy duty soluble oil compositions characterized by their content of a high percentage of loosely combined sulfur, a particular weight relationship of emulsifier, the type of coupling agent and a particular acid number range for the finished blend.

The art of formulating and using emulsifiable cutting oil compositions has developed to the point where improved multifunctional characteristics, including both lubrication and cooling in the proper balance, is attainable by incorporating in the formulation the proper proportions of mineral oil and emulsifiable base, or soap, along with a coupling agent or stabilizer. Although generally referred to as soluble oils, and this nomenclature will be followed in describing the instant invention, these materials ordinarily form an emulsion when mixed with water. In order to distinguish between the soluble oil mixture in its concentrate form and the emulsion which is produced when this concentrate is admixed with sufficient quantities of water, the former mixture will be referred to in describing this invention as the soluble oil blend and the latter composition will be termed the soluble oil emulsion. The emulsion which is formed when the soluble oil blend is mixed with water is an intricate colloidal system of the oil-in-water type wherein the aqueous phase constitutes the continuous or dispersing phase and the mineral oil constituent is the dispersed phase. A third and separate phase may be described as the oil-water interface which is the result of a delicately balanced chemical composition, partially soluble in the oil and partially soluble in the water phase.

In the formulation of these soluble oils, considerable emphasis is placed upon the uniformity and the stability of the soluble oil emulsion, which is a delicately balanced system. Therefore, the components of the soluble oil blend are chosen with concinnity in order to insure conformance with the desirable characteristics.

In developing a soluble oil blend containing the usual emulsifier, extender and refined mineral oil and incorporating a sulfur-containing addend to impart extreme pressure and anti-weld characteristics to the blend, it was discovered in accordance with this invention that the degree of precipitation of a black polymer-type material during storage of the blend (without emulsification with water) was a function of the acid number of the blend. It was found that if the acid number (1948 Method) of the soluble oil blend was outside the limits of 0.50 to 2.0, a black polymer-type precipitate forms in the product resulting in its failure to pass the blend stability test. Although the acid number of the soluble oil blends is easily controlled by addition of sufficient amounts of aqueous alkali metal hydroxide to the formulation, it was found necessary to maintain the acid number within the specified limits and preferably at a value of about 0.90 (1948 Method).

In addition to the control of the acid number of the soluble oil blend it was found that the attainment of anti-weld characteristics of the finished emulsions, as evaluated by the Timken and Falex tests, is not only a function of the amount of extreme pressure addend used but also is dependent upon the content of combined sulfur in sulfur-containing extreme pressure agent used. It was found that in order to meet the Timken and Falex tests the soluble oil blend must contain at least about 15 weight percent of sulfur, combined with the carrier by heating for about 5 hours at a temperature ranging from 330° to 340° F. at atmospheric pressures, and at least about 20% by weight of the addend must be used in the soluble oil blend. Experience with a wide number of polyhydric alcohols which are used as coupling agents has further shown that of the two most useful agents, namely diethylene glycol and hexylene glycol, only the latter gives the proper blend and emulsion stability. It has further been found that there is a certain range of hexylene glycol that may be used, namely from about 2.50 to 3.50 wt. percent. Accordingly, the type and amount of coupling agent is restricted in the present formulations.

A last embodiment of the invention comprises the discovery that a certain weight relationship of the emulsifier to the extender may be used which gives a soluble oil blend which is compatible and readily emulsifiable with both hard and soft waters without creaming or foaming. In this regard, it has been found that the emulsion stability of the soluble oil blends is seriously reduced when below about 15 weight percent of emulsifier or soap content on an active ingredient wt. basis is used. A weight relationship of about 15 to 22 weight percent and preferably about 17.0 wt. percent of emulsifier to about 9.0 weight percent of extender produces a soluble oil which is readily emulsifiable with both hard and soft waters. Having thus described the various aspects of this invention, the primary objects are enumerated.

The first object of this invention is to provide a soluble oil composition having enhanced extreme pressure properties, good blend stability and emulsion stability.

A second object of the invention is to provide a heavy duty soluble oil composition having a critical acid number (1948 Method) range of between about 0.50 to 2.0.

A third object of the invention is to provide a heavy duty soluble oil composition characterized by having a relatively large amount of loosely combined sulfur, a particular weight relationship of emulsifier to extender for compatibility with both hard and soft waters, and a particular acid number range.

A fourth object of the invention is to provide a heavy duty soluble oil composition containing hexylene glycol as the coupling agent, which is characterized by its high content of loosely combined sulfur and its ability to pass the Timken, Falex, blend stability and storage stability tests.

These and other objects of the invention will become apparent as the description proceeds.

In general, soluble oil compositions of this invention comprise the following ingredients in weight percent:

| | Percent |
|---|---|
| Emulsifier | 15.0–30.0 |
| Extender | 15.0–0.0 |
| Mineral lubricating oil | 20.0–55.0 |
| Alkali metal hydroxide | 0.01–0.5 |
| Hexylene glycol | 2.5–3.5 |
| Sulfurized addend (15–22 wt. percent S) | 20.0–30.0 |
| Water | 0.01–0.5 |

The emulsifier used in the above formulations may consist of sulfonates, acid sludges, saponified phenols or naphthenic acids, sodium and potassium rosin soaps, amine soaps of rosin acid, etc., either alone or in combination with these or other emulsifiers. Because of their effectiveness as emulsifiers, sulfonates are preferred. A proprietary composition known under the trade name of Petronate, comprising about 62% sodium mahogany sulfonates prepared from petroleum, 5% water and 33% mineral oil, is preferred as the emulsifier herein. This material has an acid number of less than 0.03 (1948 Method), a sulfated ash content of 11.4%, and an API gravity of 6.7°. In describing the various compositions evaluated in this description of the invention, the term "sodium mahogany sulfonate" will be used in place of the trade name Petronate. The invention is not to be limited to any specific emulsifier.

To supplement the emulsifier used, it is advantageous to employ extenders. This expedient permits adequate emulsification of the soluble oil with lesser amounts of emulsifier. An example of an extender in the above general formulation which may be employed in conjunction with the petroleum sulfonates is a liquid mixture of sodium or potassium salts of various processed rosins and natural resins, including rosin acids, known in the art as alkali metal resinates. Potassium resinate, known under the trade name of Dresinate 92, is the preferred extender used to illustrate the invention since this salt enhances the versatility of the soluble oil blends for use in both hard and soft waters. Extenders of this nature are described in the brochure entitled, "Hercules Dresinate" published by the Hercules Powder Company (1952). Suitable extenders may be prepared from organic acids or organic acid mixtures. For example, the potassium soap of Flextal 37 may be used. Flextal 37 is the trade name for a mixture comprising 37% abietic acid and 63% of oleic with minor amounts of linoleic and linolenic acids as contaminants.

The mineral oil portion of the composition is subject to the most variation in quantity in arriving at a balanced formulation and is varied in accordance with established methods of preparing the blends. The mineral oil component to be used is generally a medium viscosity petroleum lubricating oil. This type of oil includes oils having various geographical origins such as Pennsylvania, Gulf Coast, and California. Although most oils may be used as the mineral oil constituent, Gulf Coastal oils are particularly acceptable. Also included as a component of the soluble oil blend is a coupling agent, or stabilizer, in the form of an alcohol such as ethyl alcohol, or a polyhydroxy alcohol, such as ethylene glycol, hexylene glycol and diethylene glycol. This coupling agent, herein specifically limited to hexylene glycol as heretofore stated, is soluble in both the continuous and the dispersed phase of the emulsion, thus functioning to stabilize these two phases.

In order to assist the coupling agent in providing a stable oil-in-water emulsion, control of the pH or acid number of the cutting oil emulsion is necessary. This control of the acidity of the oil-in-water emulsion is brought about by the inclusion of a fatty acid, such as oleic acid, and an alkali, such as sodium or potassium hydroxide, as constituents of the soluble oil blend. It is this combination which controls the balance of the third phase hereinbefore referred to as the interface between the oil droplets and the water. This controlled combination also permits the use of the soluble oil blend in both hard and soft waters in the formation of the finished emulsion. In the present formulations it has been found that the use of the fatty acid can be dispensed with provided the acid number is maintained between about 0.50 to 2.0 by the addition of alkali. For this purpose sodium and potassium hydroxide are preferred. Rust inhibitors, germicides, foam depressants, and additives for freeze-thaw stability may also be advantageously employed as ingredients of the composition.

It is known to prepare "sulfurized" cutting oils and that the advantageous extreme pressure properties of such cutting oils are enhanced by the presence of loosely combined sulfur in such compositions. However, in such compositions there is a limit to the amount of such loosely combined sulfur that can be incorporated in the mineral oil carrier along with the various coupling agents, emulsifiers and the like, while still retaining the much desired high detergency and emulsibility characteristics of the oil. According to the prior art, various carriers may be combined with sulfur and/or phosphorus for use in cutting oils or soluble oils. These sulfurized extreme pressure addends may contain varying amounts of sulfur and/or phosphorus and may be used in varying amounts in the compositions for their intended purpose.

It has been found in accordance with this invention that incorporation of large amounts of loosely combined and active sulfur in soluble oil compositions is not a mere matter of combining the recommended amounts of emulsifier and extender, non-corrosive base, and mineral oil together, as would be expected from the prior art. In accordance with this invention, the advantages of larger amounts of loosely combined sulfur in the composition are retained without loss of detergency and emulsification properties by striking a certain critical balance between the acid number of the finished composition, the weight relationship of the emulsifier portion of the composition, and the type of coupler used. More specifically, it has now been found that when using sulfurized cutting oil bases containing from about 15 wt. percent to as high as 22 wt. percent of sulfur in loosely combined and active form adapted to give the maximum benefits, such as extreme pressure qualities, there is a lack of consistency regarding the storage stability, detergency and emulsibility of the blends. Furthermore, bench tests on emulsions prepared with these formulations were not satisfactory; that is, the level of performance relative to the Timken 400 R. P. M. and Falex tests was much lower than expected. Precipitation of polymeric material was encountered when the blends were stored, and the emulsification qualities of the blends were below standard. Evaluation of a number of blends showed that the acid number of the finished blend is of prime importance and must be maintained within a critical range of about 0.50 to 2.0 to prevent the formation of a black polymer-type precipitate in the product both during use and in storage. Blends with acid numbers outside this range were completely unsatisfactory both as to blend and emulsion stability. Evaluation of a large number of soluble oil blends showed that the emulsion stability of the blends was seriously reduced when below about 15 weight percent of emulsifier or soap content, on an active ingredient basis, was used. A weight relationship of emulsifier of about 15 to 22, and preferably about 17.0 percent active ingredient content, was found to give the best results. And lastly, hexylene glycol was found to be the coupler required for the composition. Thus, as the experiments described herein will show, to retain the enhanced performance qualities of a soluble oil blend containing at least 20 weight percent of an additive which in turn contains 15 or more weight percent of loosely combined sulfur, the acid number of the composition must be within 0.50 to 2.0 to attain acceptable storage stability of the soluble oil blend. Also, at least about 15 weight percent of emulsifier on an active ingredient basis must be present, and a coupler equivalent in performance to hexylene glycol must be used.

These and other objects of the invention will become apparent from the following description:

In order to demonstrate these various facets of the invention, a series of experiments are described to show first that not all extreme pressure addends are equivalent in their ability to carry an emulsion through the Timken and Falex tests. A number of soluble oil blends were prepared using sodium mahogany sulfonate as the emulsifier, diethylene glycol and hexylene glycol as the coupling agent, a good grade of mineral lubricating oil and various concentrations of sulfurized, sulfurized-phosphorized and mixtures of sulfurized and phosphorized extreme pressure addends. In each instance 15.0 wt. percent of sodium mahogany sulfonate and 4.0 wt. percent of diethylene glycol was used with the indicated amounts of mineral lubricating oil and extreme pressure (EP) additive. The one exception is blend No. 9* which contained 9.90 wt. percent of sodium mahogany sulfonate, 3.96 wt. percent of hexylene glycol as the coupler and 1.0 wt. percent of an aqueous potassium hydroxide (50.1% assay) solution. One part of each soluble oil composition was diluted or blended with ten parts of distilled water and the emulsions formed were evaluated on the Timken and Falex machines. The results are shown in the following Table I.

*Table I*

| Blend No. | Wt. Percent Min. Oil | EP Additive | | 400 R. P. M. Timken | | Falex Test | |
|---|---|---|---|---|---|---|---|
| | | Wt. Percent | Type | Max. Load, Lbs. | P. s. i. | Max. Load, Lbs. | Torque |
| 1 | 70.53 | 10.47 | A | 40 | 12,300 | 4,150 | 77 |
| 2 | 70.53 | 10.47 | B | 50 | 10,900 | 3,800 | 65 |
| 3 | 61.20 | 19.80 | B | 50 | 14,200 | 4,150 | 53.5 |
| 4 | 70.53 | 10.47 | C | 50 | 14,900 | 3,600 | 76 |
| 5 | 70.53 | 10.47 | D | 50 | 13,500 | 3,100 | 79 |
| 6 | 60.06 | 20.94 | D | 60 | 13,100 | 4,100 | 61 |
| 7 | 48.00 | 33.00 | D | 80 | 17,400 | 4,000 | 53 |
| 8 | 68.03 | 12.97 | E | 35 | 11,600 | 3,950 | 83 |
| 9* | 65.34 | 19.80 | F | 80 | 17,800 | 4,350 | 59 |

The mineral oil used in the above formulations had the following characteristics: Gravity, API, 165°; viscosity at 100° F., 256 SUS; viscosity at 210° F., 44.7 SUS; V. I., 1.5; carbon residue, 0.32%; sulfur, 1.98%; acid number (1948 Method), 4.4. All of the E. P. additives evaluated are commercially available materials, known and prepared in accordance with the general procedures of the art. Additive "A" is sulfurized lard oil containing 7% by wt. of sulfur. Additive "B" is sulfurized-phosphorized lard oil containing 7% by wt. of sulfur and 0.44% by wt. of phosphorus. Sulfurized sperm oil containing 10.8% by wt. of sulfur constituted additive "C." E. P. addend "D" is a product obtained by sulfurizing methyl esters of animal fatty acids to obtain 7% by wt. of combined sulfur therein. Addend "E" comprises a mixture of sulfurized methyl esters of animal fatty acids and phosphorized glyceryl trioleate showing an analysis of 7% by wt. of sulfur and 0.45% by wt. of phosphorus.

As seen from Table I, the various E. P. addends used imparted high Timken and Falex test values to water emulsions of the finished blends; however, none of the values are as high as addend F containing 12% of sulfur. For heavy duty performance the maximum beam load at 400 R. P. M. should be at least 100# and the p. s. i. pressure, which is variable, may be over 20,000 for the Timken test. Also, the Falex test should show a maximum load of at least 4500# for acceptable performance with no seizure and a torque somewhere in the neighborhood of 60 or less. Experiments have indicated that an addend may be satisfactory as far as performance is concerned and unsatisfactory on storage stability testing. Also, it is necessary for some applications that the soluble oil blend emulsions exceed the minimum values for Timken and Falex tests aforementioned. Consequently, a series of sulfurized addends were prepared containing greater amounts of sulfur in an effort to increase the performance characteristics without affecting the blend or storage stability. For this purpose the raw material selected as the sulfur carrier was methyl esters of animal fatty acids. This material has the following physical and chemical characteristics: Gravity, API, 28.7%; color, ASTM (NPA), 3+; pour point, +50° F.; viscosity at 100° F., 46.0 SUS, saponification No., 197; free fatty acid content, 4.59%; iodine No., 65.5; and containing a trace of water. Various batches of these esters were prepared, each reacted with a quantity of sulfur calculated to give about 15 weight percent of free or combined sulfur in the reaction product. The ester and sulfur were mixed in a reaction vessel and heated to a temperature of about 335° F. at atmospheric pressure, conditions found to incorporate the greatest amount of sulfur in the carrier. Since the proportion of free and combined sulfur in the product is dependent on the reaction time, this variable was changed to show the effect of processing time on Timken and Falex tests of the resultant emulsified blend. The results are shown in Table II. In each instance the blends contained 20% by weight of the sulfurized esters.

*Table II*

| Blend No. | Processing Time of additive, hours | Timken (400 R. P. M.) | | Falex | |
|---|---|---|---|---|---|
| | | Max. Load, Lbs. | P. s. i. | Max. Load, Lbs. | Torque |
| 11 | 2 | 70 | 22,600 | 4,250 | 60 |
| 12 | 3 | 95 | 20,010 | 4,275 | 58.5 |
| 13 | 3 | 100 | 19,600 | 4,350 | 58 |
| 14 | 4 | 100 | 21,800 | 4,500 | 55 |
| 15 | 4 | 100 | 19,020 | 4,500 | 69.5 |
| 16 | 5 | 100 | 28,148 | 4,500 | 59 |
| 17 | 5 | 100 | 19,020 | 4,500 | 59 |
| 18 | 6 | 100 | 23,000 | 4,200 | 59.5 |
| 19 | 7 | 100 | 23,000 | 4,400 | 61.5 |
| 20 | 7½ | 100 | 17,800 | 4,350 | 60 |

As seen from Table II, a processing time between 4 and 5 hours, and especially 5 hours, gave a sulfur-containing addend having the proper combination of free and combined sulfur to attain the highest consistent performance of the emulsified blend.

Since the performance characteristics are dependent also on the amount of sulfur-containing addend used, a series of experiments was conducted to establish the optimum percentage of extreme pressure agent necessary to obtain the maximum performance for the blend. A sulfurized product prepared from the methyl esters of animal fatty acids by reaction at 335° F. for 5 hours to obtain a product having 15% by weight of sulfur was used in the experiments of Table III.

*Table III*

| Blend No. | Percent Sulfur Additive | Timken (800 R. P. M.) | | Falex | |
|---|---|---|---|---|---|
| | | Max. Load, Lbs. | P. s. i. | Max. Load, Lbs. | Torque |
| 21 | 30.0 | 25 | 6,600 | 4,410 | 55 |
| 22 | 25.0 | 20 | 6,400 | 4,475 | 48 |
| 23 | 20.0 | 15 | 4,300 | 4,300 | 60 |
| | | Timken (400 R. P. M.) | | | |
| 24 | 20.0 | 100 | 22,600 | 4,500 | 41.5 |
| 25 | 18.0 | 95 | 19,000 | 4,350 | 59 |
| 26 | 16.0 | 75 | 16,500 | 4,425 | 60.5 |
| 27 | 14.0 | 60 | 13,500 | 4,250 | 76 |
| 28 | 12.0 | 45 | 11,000 | 4,250 | 56.5 |

From Table III it is apparent that those compositions containing not less than about 20 wt. percent of the sulfurized additive do not exhibit acceptable performance characteristics.

In another series of tests, both diethylene glycol (DEG) and hexylene glycol (HG) were used in varying quantities to formulate numerous soluble oil blends containing 15.0% by wt. of sodium mahogany sulfonate, 9.0% by wt. of potassium resinate, about 50% by wt. of mineral lubricating oil (262.9 SUS at 100° F.), 0.21% potassium hydroxide, 0.21% water and 20.0% by wt. of sulfurized methyl ethyl esters of animal fatty acids (containing 15% by wt. of sulfur, processed at 335° F. for 5 hours). These compositions were tested for blend stability (undiluted) and for emulsion stability (blended using 1 part of the soluble oil with 10 parts of hard water containing 300 p. p. m. as $CaCO_3$). The results are shown in Table IV.

Table IV

| Blend No. | Coupler | Percent Coupler | Blend Stability Percent PPT | Blend Stability No. of Days | Emulsion Stability, Percent Creaming |
|---|---|---|---|---|---|
| 29 | DEG | 3.4 | 3.0 | 2 | 0.2 |
| 30 | DEG | 4.0 | 0.5 | 6 | 1.7 |
| 31 | DEG | 3.0 | 0.5 | 27 | 3.5 |
| 32 | DEG | 5.2 | 1.0 | 1 | 0.1 |
| 33 | DEG | 3.0 | 1.0 | 1 | 0.0 |
| 34 | DEG | 3.0 | 1.0 | 1 | 0.0 |
| 35 | DEG | 3.0 | 1.0 | 1 | 0.0 |
| 36 | DEG | 3.0 | 1.0 | 2 | 0.0 |
| 37 | HG | 3.5 | 0.0 | 150 | 0.05 |
| 38 | HG | 3.5 | 0.0 | 150 | 1.3 |
| 39 | HG | 3.5 | 0.0 | 150 | 2.6 |
| 40 | HG | 3.5 | 0.0 | 150 | 2.6 |
| 41 | HG | 3.0 | 0.0 | 150 | 0.0 |
| 42 | HG | 3.0 | 0.0 | 150 | 0.0 |
| 43 | HG | 2.75 | 0.0 | 150 | 0.0 |
| 44 | HG | 3.25 | 0.0 | 150 | 0.0 |
| 45 | HG | 2.50 | 0.0 | 150 | 0.0 |
| 46 | HG | 3.50 | 0.0 | 150 | 0.05 |
| 47 | HG | 2.85 | 0.0 | 150 | 0.0 |
| 48 | HG | 2.75 | 0.0 | 150 | 0.05 |
| 49 | HG | 2.50 | 0.0 | 150 | 0.05 |

Compositions 29, 30 and 31 containing diethylene glycol fail the emulsion stability test and the blend stability test. Compositions 32–36 pass the emulsion stability test but fail the blend stability test. All of the compositions containing hexylene glycol pass both tests.

An important feature of this invention is the finding that a certain range of acid number (1948 Method) must be maintained by adjusting the amount of aqueous alkali metal hydroxide added to the soluble oil blend in order to maintain acceptable blend stability during extended periods of storage. To demonstrate this a number of soluble oil compositions were prepared using the preferred ingredients aforementioned in connection with the experiments on the coupling agent, except that the acid number was adjusted to various descending values before the blend stability was observed. The results are shown in Table V.

Table V

| Blend No. | Acid Number (1948 Method) | Blend Stability Percent Ppt'n | Blend Stability No. of Days |
|---|---|---|---|
| 50 | 5.91 | 3.0 | 2 |
| 51 | 5.72 | 3.0 | 5 |
| 52 | 5.59 | 3.0 | 1 |
| 53 | 5.59 | 1.0 | 2 |
| 54 | 5.29 | 1.0 | 2 |
| 55 | 4.67 | 0.5 | 6 |
| 56 | 4.64 | 0.5 | 14 |
| 57 | 3.80 | 1.0 | 1 |
| 58 | 3.69 | 0.5 | 2 |
| 59 | 3.35 | 0.5 | 7 |
| 60 | 3.35 | 0.5 | 5 |
| 61 | 3.35 | 1.0 | 10 |
| 62 | 3.35 | 0.5 | 10 |
| 63 | 2.79 | 1.0 | 2 |
| 64 | 2.1 | — | fail-30 |
| 65 | 2.0 | 0.0 | 150 |
| 66 | 2.0 | 0.5 | 150 |
| 67 | 1.50 | 0.0 | 150 |
| 68 | 1.50 | 0.0 | 150 |
| 69 | 1.25 | 0.0 | 150 |
| 70 | 1.25 | 0.0 | 150 |
| 71 | 1.00 | 0.0 | 150 |
| 72 | .86 | 0.0 | 150 |

According to Table V, it is seen that the upper limit of the acid number is about 2.0 and that those compositions having acid numbers above this value have very poor blend stability, showing a precipitate even after 1 day of storage. Those blends having acid number of 2.0 or below are shown to be exceptionally stable even after 150 days in storage. Those compositions having acid numbers outside of the range of 0.50 to 2.0 may be used to prepare satisfactory emulsions for use on cutting machines to meet the performance requirements, but the presence of a precipitate in the blend itself is undesirable and the presence of a precipitate in the emulsion itself is likewise undesirable, since it can clog lines and cause accumulation of contaminants.

In order to establish the effect of the proportions of sodium mahogany sulfonate and potassium resinate in the preferred compositions, a comparison of the emulsion stability with both hard and soft water of three soluble oil blends having different weight percentages of these ingredients, and containing as nearly as possible the same amounts of the balance of ingredients, is made in Table VI. Each composition shown in Table VI had an acid number of about 0.90, the preferred acidity for purposes of this invention.

Table VI

| Blend No. | Composition, Wt. Percent | | | | | | | Emulsion Stability | |
|---|---|---|---|---|---|---|---|---|---|
| | Sod. Mahogany Sulfonate | Potassium Resinate | Mineral Oil | KOH | $H_2O$ | HG | S-Methyl esters | Diluted 1 pt. to 10 pts. w./Distilled $H_2O$ | Diluted 1 pt. to 10 pts. with hard water (300 p. p. m. as $CaCO_3$) |
| 73 | 15.0 | 9.0 | 52.73 | .21 | .21 | 2.85 | 20.0 | Uniform—no creaming | Uniform—no creaming. |
| 74 | 12.0 | 12.0 | 52.49 | .21 | .30 | 3.0 | 20.0 | Moderate creaming (not pass). | Trace creaming. |
| 75 | 12.0 | 9.0 | 55.58 | .41 | .20 | 3.0 | 20.0 | Heavy creaming | Heavy creaming. |

The sulfur carrier used in accordance with this invention may be broadly defined as alkyl esters of animal and vegetable fatty acids in which the alkyl group comprises methyl or ethyl groups. The acids from which the esters are prepared should contain between 16 to 18 carbon atoms, such as stearic, oleic, linoleic and linolenic acids contained in lard oil. Other acids include palmitic, palmitoleic, ricinoleic, eleostearic and licanic which are found in vegetable oils as well as some animal oils and fats. Esterification of the fatty acids may be carried out by any of the known methods available in the art, i. e., by heating an alcohol and an acid, by the action of acid chlorides of the acids on an alcohol such as methyl alcohol, or by preparation from other esters through interchange of the alcohol or acyl radical. In the esterification of most fatty acids a catalyst such as sulfuric acid may be used. Lard oil, beef tallow, and butter fat contain a predominance of $C_{16}$ to $C_{18}$ acids and form acceptable starting materials. A grade of fat known as Larex #5 having the following characteristics forms a good material from which acceptable methyl or ethyl esters may be prepared, after removal of unsaturates:

Color:
   (AOCS method Ca 13a–43) _____ 23 max.
   (NPA (ASTM D155–45T)) _____ 6 max.
Pour point (ASTM D97–47) _____ 60° F. max.
Moisture (AOCS Ca 2a–45) _____ ⎫
Insolubles (AOCS Ca 3–25) _____ ⎬ 1.2% max.
Unsaponifiables (AOCS Ca 6a–40) ____ ⎭
Saponification No. (ASTM D94–52T) ____ 192–198.
Iodine No. (AOCS Ca 1–25) _____ 70–80.
Titer (°C.) (on extracted fatty acid portion) (AOCS C12–41) _____ 34–37.
Percent free fatty acids (AOCS Ca 5a–40)_ 5–10.

After methylation this material shows the following characteristics: Gravity, API, 28.7°; color, ASTM (NPA), 3+; pour point, +50° F.; viscosity at 100° F., 46.0 SUS; saponification no., 197; free fatty acids, 4.59%;

iodine no., 65.5; and contains a trace of water. Upon treatment with elemental sulfur under conditions to combine therewith about 15.0% by weight of sulfur, the above specified methyl esters exhibit the following specifications: API gravity, 11.9°; pour point, +55° F.; color, ASTM (NPA), 5+ Dil.; and viscosity at 100° F., 148.8 SUS.

In order to further demonstrate the invention, a preferred soluble oil blend containing 15.0 wt. percent sodium mahogany sulfonate, 9.0% potassium resinate, 52.73% solvent refined neutral mineral oil having a viscosity at 100° F. of 262.9 SUS, potassium hydroxide (100% assay) 0.21%, water 0.21%, hexylene glycol 2.85% and 20% of the above sulfurized methyl esters of lard oil acids, was tested for performance and emulsion stability. Emulsions of one part of this soluble oil and 10 parts of distilled water were perfectly uniform as were emulsions of one part of the soluble oil with 50 parts of distilled water. The same results were obtained using equivalent ratios of soluble oil and hard water containing 300 p. p. m. as calcium carbonate.

On subjecting duplicate blends of 1 part of this soluble oil with 10 parts of hard water to the Timken 400 R. P. M. test, a 100# beam load was sustained without seizure at 22,500 p. s. i. pressure; while on the Falex test, a maximum load of 4500 lbs. under a torque of 77 inch lbs. with no seizure was obtained. In addition it was observed that the aforementioned soluble oil blend exhibited no foaming. This is considered a unique property for a composition containing a relatively high content of high sulfur material. The potassium resinate used, known in the trade as Dresinate 92, has an acid number (1948 Method) of 14.5, contains 10.7% sulfated ash, about 88% solids, shows an ash analysis of K, Na, Fe, color (NPA) +3 Dil., a viscosity at 100° F. of 21345 SUS and 12.8% of water according to the manufacturers' specifications.

Another feature of aforedescribed preferred compositions is the ability to prevent stain and rust when in contact with metal parts as indicated by the so-called Dip test and the Contact test. In the Dip test several test specimens of SAE 1020 steel, cast iron, aluminum, copper and brass are polished with 2/0 garnet paper, washed thoroughly in V. M. & P. naphtha, dried and dipped into the emulsions under test. The specimens are hung on glass rods inserted in holes located in the center of each test piece and exposed to the atmosphere for 67 hours after which they are inspected for the presence of rust and stain. In the Contact test the same test specimens as prepared for the Dip test are subjected in pairs to contact with the soluble oil emulsion by dipping and placed in a small Petri dish one upon the other. At the end of 67 hours the specimens are removed, separated from each other, and the contacted surfaces are laid face up. The specimens are then washed with distilled water to remove any remaining soluble oil and examined thoroughly for staining and rusting. The results of applying these tests to the preferred composition of this invention are shown in Table VII.

Table VII

DIP TEST

| Emulsion Ratio | Steel | Iron | Aluminum | Copper | Brass |
| --- | --- | --- | --- | --- | --- |
| 1:10 | None | Very light | None | Light | Very light. |
| 1:50 | do | Light | do | do | Do. |

CONTACT TEST

| Emulsion Ratio | Steel | Iron | Aluminum | Copper | Brass |
| --- | --- | --- | --- | --- | --- |
| 1:10 | Very light | Heavy | Light | Moderate | Moderate. |
| 1:50 | Light | Moderate | Very light | Light | Light. |

The emulsion ratios of 1:10 or 1:50 mean parts of soluble oil to parts of distilled water. The ratings are as to the degree of staining only.

The procedure in making the sulfurized methyl esters of fatty acids to be used in the hereindescribed soluble oils and emulsions comprises charging about 85.0 formula weight percent (13,971 lbs.) of methyl esters to an open reaction kettle equipped with a mechanical stirrer and heating to a temperature of about 335° F.±3° F. The batch is agitated at high speed and dusted with flowers of sulfur. About 15.0 formula wt. percent or 2,465 lbs. of sulfur are added in this manner. The processing time is calculated from the moment of last addition of sulfur. At the end of 30 minutes of high speed agitation, the stirrer is slowed to slow speed operation and the reaction continued for an additional 4½ hours at 335° F. ±3° F. After 5 hours' reaction time the heat is stopped and the reaction product cooled to room temperature as quickly as possible.

In formulating the soluble oil blend the procedure is to add the required amount of alkali metal hydroxide, preferably potassium hydroxide, to a mixing vessel. The proper amount of water is added quickly to the hydroxide and after the hydroxide has dissolved the solution is cooled to 110° F. or less. At this point the solution is reweighed and any weight loss is adjusted by the addition of water. In calculating the weight of potassium hydroxide used, the influence of the purity or assay thereof is taken into account. In using 100% assay hydroxide, 0.21% thereof with 0.21% of water will be used to put 0.42% solution in the formulation. If 95% assay hydroxide is used, then a correspondingly increased weight thereof with less water is employed, i. e., 0.221% KOH with 0.199% water. For 80% assay KOH, the weights would be 0.263% KOH plus 0.157% water in order to incorporate 0.42% solution.

The mineral oil is charged to a mixing kettle and the sodium mahogany sulfonate, preheated to 120° F. is incorporated by stirring. To this mixture is added the previously prepared hydroxide solution and stirring is continued until good dispersion is obtained. Next the hexylene glycol is incorporated and finally the sulfurized addend, each with stirring, until a homogeneous blend is obtained. The product has a color, ASTM (NPA), of 7+ dilute; API gravity, 15.5°; pour point, +5° F.; contains 2.6 to 2.8% sulfated ash; and 3.40 to 3.90% sulfur as typical values.

Having thus described the invention and given certain non-limiting examples, the invention herein is defined in the appended claims.

What is claimed is:

1. A heavy duty soluble oil blend consisting esesntially of the following ingredients in weight percent:

| | |
| --- | --- |
| Sodium mahogany sulfonate | 15.0–30.0 |
| Potassium resinate | 15.0– 0.0 |
| Mineral lubricating oil | 20.0–55.0 |
| Potassium hydroxide | 0.01– 0.5 |
| Hexylene glycol | 2.5– 3.5 |
| Sulfurized alkyl ester of $C_{16}$–$C_{18}$ animal fatty acids containing about 15 to 22 weight percent sulfur | 20.0–30.0 |
| Water | 0.01– 0.5 | said composition having the potassium hydroxide content adjusted to give the finished blend an acid number (1948 method) of about 0.50 to 2.0, and said sulfurized alkyl esters of $C_{16}$–$C_{18}$ animal fatty acids being prepared by reaction of said esters with sulfur at a temperature of about 332° to 338° F. for about 5 hours whereby at least 15 weight percent and no more than about 22 weight percent of sulfur is combined therewith.

2. A heavy duty soluble oil blend in accordance with claim 1 in which said sulfurized alkyl esters of $C_{16}$–$C_{18}$ animal fatty acids are methyl esters of animal fatty acids obtained from lard oil.

3. A heavy duty soluble oil blend in accordance with claim 2 in which the methyl esters are methyl oleate.

4. A heavy duty soluble oil blend in accordance with claim 1 in which the acid number (1948 method) is 0.90.

5. A heavy duty soluble oil blend in accordance with claim 1 in which the amount of sodium mahogany sulfonate is about 15 to 22 weight percent and the amount of said potassium resinate is about 9 weight percent whereby said composition is characterized by its ability to form uniform emulsions with both hard and soft water without the appearance of cream.

6. A heavy duty soluble oil blend in accordance with claim 5 in which the amount of said sodium mahogany sulfonate is about 17 weight percent.

7. A heavy duty soluble oil blend consisting of the following ingredients in weight percent:

| | |
|---|---|
| Sodium mahogany sulfonate | 15.0 |
| Potassium resinate | 9.0 |
| Mineral oil (262.9 SUS at 100° F.) | 52.73 |
| Potassium hydroxide (100% assay) | 0.21 |
| Water | 0.21 |
| Hexylene glycol | 2.85 |
| Sulfurized methyl esters of $C_{16}$–$C_{18}$ animal fatty acids containing about 15–22 wt. percent sulfur | 20.0 | said composition having an acid number (1948 method) of between about 0.5 and 2.0, said sulfurized methyl esters of $C_{16}$–$C_{18}$ animal fatty acids being prepared by reaction of said esters with sulfur at a temperature of 332° to 338° F. for about 5 hours whereby at least about 15 weight percent and no more than about 22 weight percent of sulfur is combined therewith, said blend being characterized by its emulsion stability in both hard and soft water, storage stability and ability to meet the 100# maximum load at 400 R. P. M. in the Timken test and 4500# maximum load in the Falex test.

References Cited in the file of this patent

UNITED STATES PATENTS

| | | |
|---|---|---|
| 1,907,920 | Wilkin | May 9, 1933 |
| 2,065,248 | Smith | Dec. 22, 1936 |
| 2,165,436 | Zimmer et al. | July 11, 1939 |
| 2,179,061 | Smith | Nov. 7, 1939 |

OTHER REFERENCES

"Hexylene Glycol," Shell Chem. Corp., Tech. Booklet SC–50–1 (pp. 15 and 18).